United States Patent
Tice et al.

(10) Patent No.: US 6,252,501 B1
(45) Date of Patent: Jun. 26, 2001

(54) MESSAGE REPEATING APPARATUS AND METHOD

(75) Inventors: Lee D. Tice, Bartlett; Jerry L. Howard, Herscher; Robert J. Clow, Aurora; Manley S. Keeler, Naperville, all of IL (US)

(73) Assignee: Pittway Corporation, Chicago, IL (US)

( * ) Notice: Subject to any disclaimer, the term of this patent is extended or adjusted under 35 U.S.C. 154(b) by 0 days.

(21) Appl. No.: 09/210,041

(22) Filed: Dec. 11, 1998

(51) Int. Cl.$^7$ ..................................................... G08B 29/00
(52) U.S. Cl. ........................ 340/506; 340/502; 340/504; 340/508; 340/533; 340/539
(58) Field of Search .................................. 340/506, 502, 340/504, 508, 511, 531, 533, 539

(56) References Cited

U.S. PATENT DOCUMENTS

| | | |
|---|---|---|
| 4,356,546 * | 10/1982 | Whiteside et al. ............... 340/511 X |
| 4,525,700 | 6/1985 | Kimura et al. ....................... 340/518 |
| 4,535,450 | 8/1985 | Tan ..................................... 370/461 |
| 4,573,154 * | 2/1986 | Nakata et al. ......................... 371/34 |
| 4,667,193 | 5/1987 | Cotie et al. .......................... 250/573 |
| 4,701,625 | 10/1987 | Kimura .......................... 340/825.52 |
| 4,725,834 | 2/1988 | Chang et al. . |
| 4,761,646 | 8/1988 | Choquet et al. ..................... 340/518 |
| 4,916,432 | 4/1990 | Tice et al. ............................ 370/400 |
| 4,918,690 | 4/1990 | Markkula, Jr. et al. ............. 370/419 |
| 4,939,728 | 7/1990 | Markkula, Jr. et al. ............. 714/776 |
| 4,947,484 | 8/1990 | Twitty et al. ........................ 370/400 |
| 4,969,146 | 11/1990 | Twitty et al. ........................ 370/338 |
| 4,969,147 | 11/1990 | Markkula, Jr. et al. ............. 340/518 |
| 4,996,518 | 2/1991 | Takahashi et al. .................. 340/518 |
| 5,117,219 | 5/1992 | Tice et al. ........................... 340/518 |
| 5,193,152 | 3/1993 | Smith .................................. 709/220 |
| 5,216,675 | 6/1993 | Melliar-Smith et al. . |
| 5,297,143 | 3/1994 | Fridrich et al. ..................... 370/445 |
| 5,500,852 | 3/1996 | Riley .................................. 370/254 |
| 5,513,324 | 4/1996 | Dolin, Jr. et al. .................. 709/237 |
| 5,519,878 | 5/1996 | Dolin, Jr. ............................ 709/220 |
| 5,525,962 | 6/1996 | Tice et al. ........................... 340/506 |
| 5,629,948 * | 5/1997 | Hagiwara et al. ................... 371/132 |
| 5,705,979 * | 1/1998 | Fierro et al. ........................ 340/517 |

FOREIGN PATENT DOCUMENTS

| | | |
|---|---|---|
| 0 201 253 A2 | 11/1986 | (EP) . |
| 516373 A1 | 12/1992 | (EP) . |
| 516374 B1 | 12/1992 | (EP) . |
| 2 296 988 | 7/1996 | (GB) . |
| 2 311 398 | 9/1997 | (GB) . |

OTHER PUBLICATIONS

Search Report dated Feb. 16, 2000, for the British counterpart Application No. GB 9929337.5.
U.S. application No. 09/205,462, Tice et al., filed Dec. 4, 1998.
U.S. application No. 09/189,383, Tice et al., filed Nov. 10, 1998.
U.S. application No. 09/184,409, Keeler et al., filed Nov. 2, 1998.
U.S. application No. 08/906,277, Tice, filed Aug. 5, 1997.

* cited by examiner

Primary Examiner—Daryl Pope
(74) Attorney, Agent, or Firm—Rockey, Milnamow & Katz, Ltd.

(57) ABSTRACT

A multi-processor communication system includes a plurality of processors in bidirectional communication with one another. One processor can transmit a message to an intended recipient. The message can be correctly received by other processors. In the event that the intended processor does not correctly receive the message and transmits a failure indicating message, the other processors, upon detection of the failure will retransmit the message. Ambient condition sensors can be coupled to some of the processors.

90 Claims, 3 Drawing Sheets

MESSAGE REPEATING APPARATUS AND METHOD

FIELD OF THE INVENTION

The invention pertains to apparatus and methods for communicating signals between processors in multi-processor systems. More particularly, the invention pertains to such systems wherein the processors communicate with one another via a communications medium.

BACKGROUND OF THE INVENTION

Communications circuitry for use in multi-processor systems dedicated to monitoring or supervising regions is known. One example is disclosed in Tice et al U.S. Pat. No. 4,916,432 entitled Smoke and Fire Detection System Communication. Another is disclosed in Tice U.S. Pat. No. 5,525,962 entitled Communication System and Method. Both of the noted patents are assigned to the assignee hereof and are hereby incorporated herein by reference.

Another system is disclosed in copending application Ser. No. 08/906,277, filed Aug. 5, 1997 and entitled Multi-Processor Communication System. This application is also assigned to the assignee hereof and is also incorporated by reference.

While known systems are useful and have been effective, it would be desirable to be able to improve the level of reliability of transmission of information in a given system. Further, it would be desirable to be able to provide apparatus and methods of retransmission essentially automatically. Such an environment would be useful in supervision or alarm systems as well as in general purpose local area networks.

SUMMARY OF THE INVENTION

A multi-processor communications system or network provides for repeated transmissions of messages where an intended receiver signals that the received message failed an integrity test. In that event, those processors, not the intended recipients of the message, which had correctly received the message will automatically retransmit the message.

In one aspect, there can be a plurality of programmed processors which communicate by a bidirectional communications medium. The medium can correspond to the ambient atmosphere for RF, infrared or ultrasonic transmissions. Alternately, the medium can correspond to optical or wire cable for optical or electrical transmissions.

Each processor can analyze all received transmissions. Where a processor determines that it is not an intended recipient of a respective transmission, but where it has received that transmission with a predetermined degree of integrity, that processor, and any others so situated can "listen" for an "integrity deficient" message on the medium generated by the intended recipient of the message. In that instance, any processor which has properly received the message can rebroadcast same to the network. The rebroadcast message, coming from a different transmission source, may be received by the intended recipient with the required degree of integrity.

In another aspect, in a communication system, messages are transmitted to/from devices or to/from a control unit. In the event that errors are detected in the communications, the other devices in the system that did not detect any errors can act as repeaters of the original message. This will increase the likelihood of the message being received by all intended devices or the control unit without additional errors.

Marginal transmission lines or noise conditions in the system can be overcome because the devices that are acting as repeaters are likely to be closer to the devices or control unit having difficulty receiving the messages.

In another aspect, a system includes a plurality of communication units, wherein each of the units is in bidirectional communication with others of the units. The units include detection circuitry for receipt of messages transmitted by others of the units and transmission circuitry for broadcasting of messages to at least one other unit. The detection circuitry and the transmission circuitry are coupled to control circuitry.

A first transmitting unit sends a first message to a second unit. The second unit is required to send an acknowledgment message in response to receiving the message without error. At least a first, second, and third unit are capable of receiving the first message and storing it.

An acknowledgment message is not transmitted by the second unit in the presence of an error. The missing message thus indicates that there was a transmission error. In response to not receiving the acknowledgment message, at least a third unit retransmits the first message to the second unit.

If devices are operating as repeaters to pass messages between devices, the last unit that sent the message that was not received error free by the next unit is considered the first unit sending the first message. The next unit is considered the second unit.

In another system, a plurality of communication units is in bidirectional communication with others of the units. Each of the units includes detection circuitry for receipt of messages transmitted by at least one other unit and transmission circuitry for broadcasting of messages to at least one other unit. The detection circuitry and the transmission circuitry are coupled to control circuitry.

The system includes executable commands at the respective units to identify that a first transmitted message from a first unit was not received without error by a second unit. A third unit will repeat the first transmitted message when it has determined that the second unit did not receive the message without error.

A multi-processor communications system includes a plurality of processors that can communicate via a medium. At least a first programmed processor includes interface circuitry for transmitting a first file via the medium to a second processor. The system includes programs effective to identify that an error has occurred in transmitting the first file. In response, a third processor transmits a second file which contains at least part of the first file via the medium when an error has occurred in the first transmission.

The programs to identify that an error has occurred in transmission of the first file detect that the second processor did not send an acknowledgment message after the first processor transmitted the first message.

In yet another aspect, system operation can be verified by keeping track of the presence or absence of communication errors noted by respective devices of the system. For example, the devices which are monitoring the communications medium of the system can carry out an error or integrity check of each message being monitored, including those directed to other devices. Where errors have been detected, an internal flag can be set or indicator stored.

Subsequently, the respective device or devices can then transmit the error indicators in response to a message or command requesting a transmission of its error monitoring indicators. The command can be issued by another device or a common control element. Message integrity can be verified using check sums or any other suitable processes without departing from the spirit and scope of the present invention.

Advantageously, since all messages received by devices of the system will be assessed from the point of view of the integrity of the message, irrespective of whether that message is intended for the receiving device or not, the integrity of the communication medium can be evaluated. An inappropriately large incidence of transmission errors which are detected by a particular device may well be indicative of a need to carry out maintenance on the system in the vicinity of that device.

In a further aspect, each device of a multiple device system can function in a normal mode and a repeat mode. Each device can monitor the medium, whether wired or wireless. Data values received by multiple devices can be immediately retransmitted, via the medium, to increase received signal strength at the intended receiving device.

In this embodiment, all devices, except the intended receiving device retransmit, on a bit-by-bit basis information from an originating device. This retransmission occurs irrespective of the absence of errors in the received message. Hence, signal strength throughout the medium will be enhanced minimizing noise induced errors or errors due to losses from shunt impedances or capacitive effects.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Figure 1:
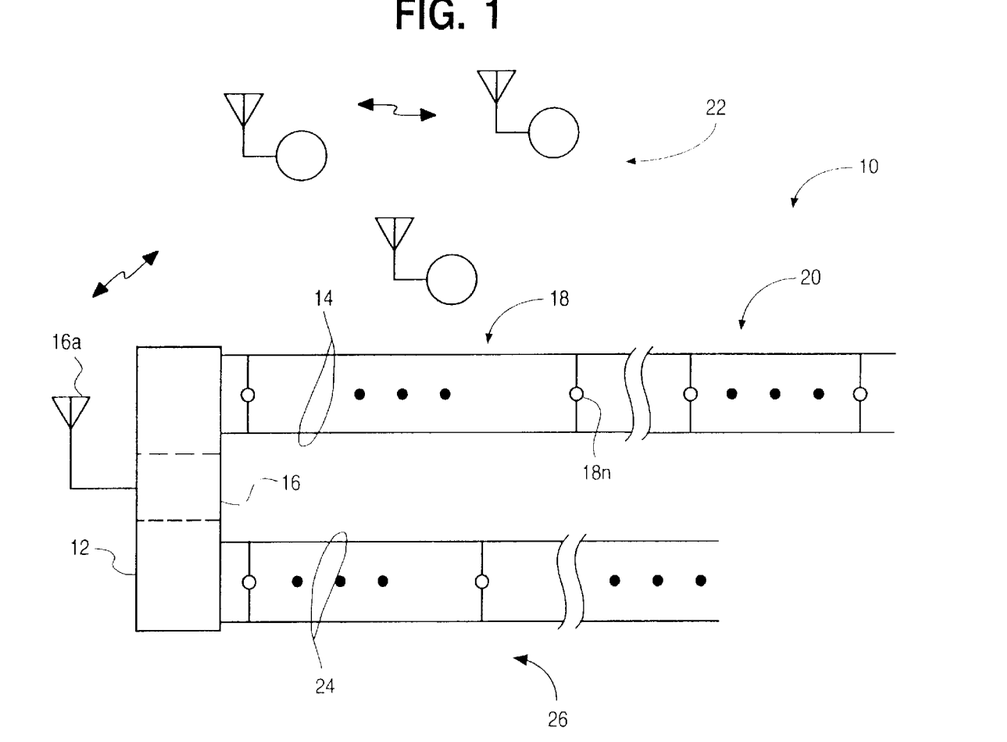
FIG. 1 is a block diagram of a system in accordance with the present invention.

FIG. 1 illustrates a multi-processor system 10 which can be used for monitoring a plurality of conditions in one or more regions to be supervised. The system 10 includes an optional common control unit 12 which could be implemented as one or more interconnected programmed processors and associated, prestored instructions.

The unit 12 includes an interface for coupling, for example, to a communications medium 14, illustrated in FIG. 1 for exemplary purposes only as an optical or electrical cable. Alternately, the system 10 can communicate wirelessly, such as by RF or infrared, via transceiver 16, illustrated in phantom in FIG. 1, and antenna 16a.

Coupled to medium 14 is a plurality of electrical units 18. the units 18 could be, for example, ambient condition detectors. A plurality of control or function units 20 is also coupled to medium 14. It will be understood that the relative arrangement of the members of the pluralities 18 and 20 relative to the medium 14 is not a limitation of the present invention.

The members of the plurality 18 can include intrusion sensors, position sensors, gas sensors, fire sensors such as smoke sensors, thermal sensors or the like, and gas sensors all without limitation. The members of the plurality 20 can include solenoid actuated control or function implementing units, display devices, printers or the like.

Where system 10 incorporates a wireless communications medium, a plurality 22 of wireless units could be in bidirectional communication with transceiver 16 as well as directly with one another. The plurality 22 can include, without limitation, ambient condition detectors, as noted above as well as control or function implementation devices without limitation. The members of the plurality 22 can also directly communicate with one another.

Also coupled to the control unit 12 via a medium 24, illustrated for example as a pair of electrical cables, is a plurality 26 of output devices. These could include audible or visible output devices without limitation, speech output devices and the like. The devices 26 are intended to broadcast a message, which might indicate alarm condition, in one or more predetermined regions.

While exemplary system 10 is a monitoring system, it will be understood that the invention is not so limited. Use of the present apparatus and method in communications systems having different purposes is within the spirit and scope of the present invention.

Figure 2:
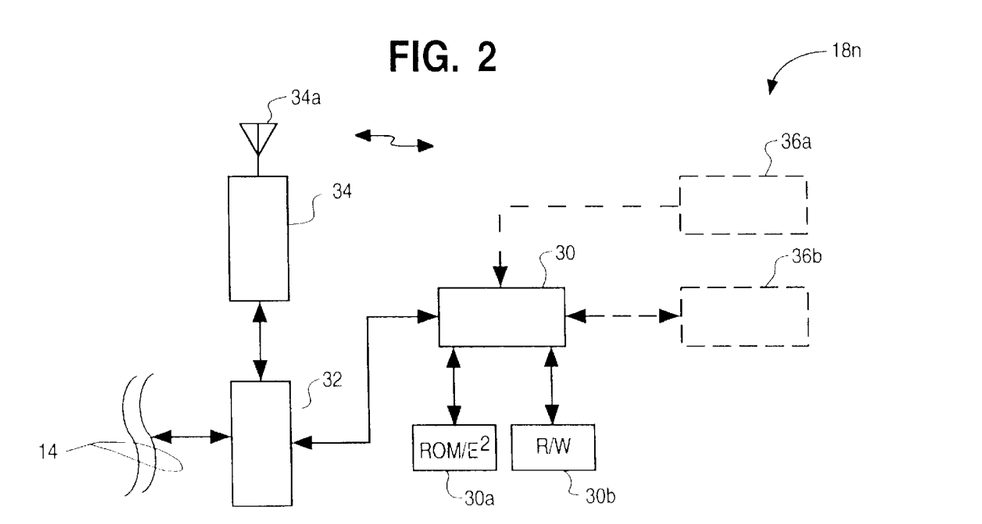
FIG. 2 is a block diagram of an electrical device usable with the system of FIG. 1.

FIG. 2 illustrates in block diagram form an exemplary device 18n of the pluralities 18, 20, 22. The device 18n can include a control element 30 which can be implemented as a programmable processor having associated read-only or programmable read-only memory 30a and read-write memory 30b. Coupled to the processor 30 is input/output interface circuitry 32. Circuitry 32 can be adapted to in turn be coupled to communication link 14. Alternately, circuitry 32 can be adapted to be coupled to a transceiver 34. Transceiver 34, which could be, for example an RF transmitter/receiver could also include an antenna 34a to facilitate bidirectional wireless communication with other members of the plurality 22, for example, or the element 12.

The member 18n can include at least one an ambient condition sensor 36a illustrated in phantom. The sensor 36a can include without limitation a smoke sensor such as a photo electric sensor, ionization sensor, gas sensor, humidity sensor or the like.

The device 18n can also optionally include output circuitry 36b for implementing an output function such as energizing a solenoid, enabling another device or the like.

Figure 3A:
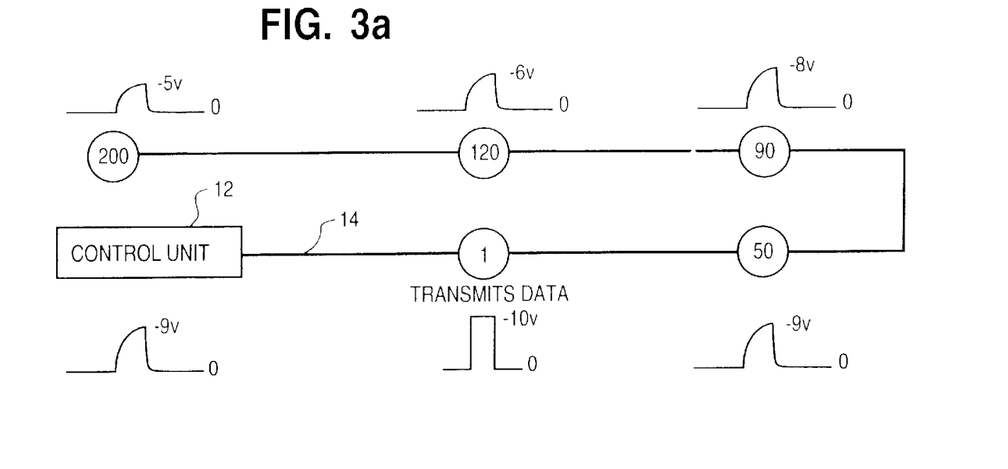
FIGS. 3A–3C illustrate different transmission and retransmission sequences for the system of FIG. 1.
Figure 3B:
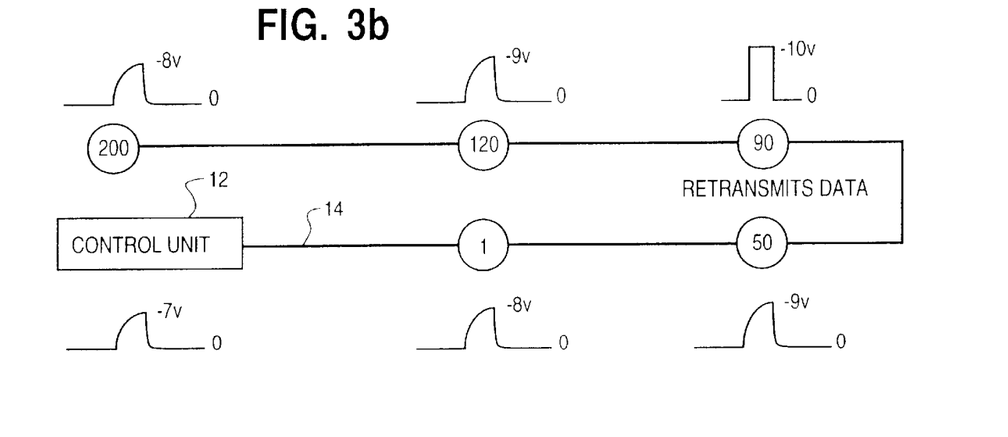
Figure 3C:
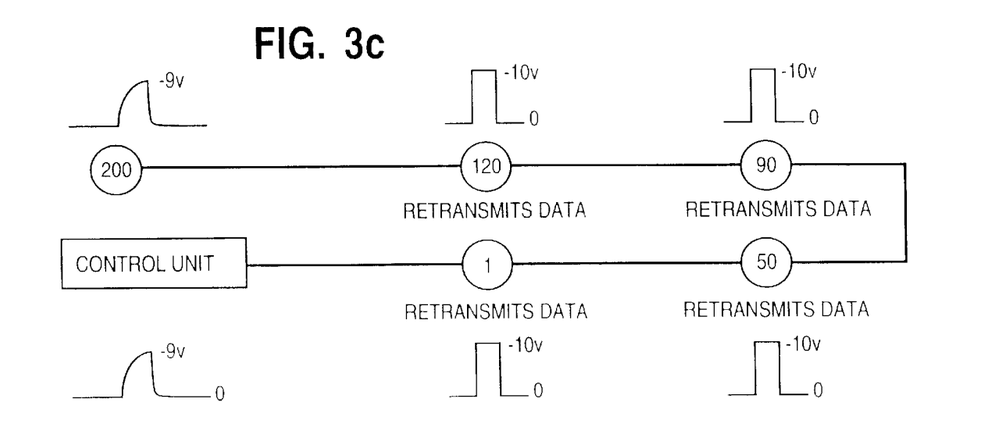

FIGS. 3A–3C illustrate a system showing the location of a plurality of devices 1, 50, 90, 120, 200 and the waveform at each device as a function of the device transmitting data.

FIG. 3A illustrates the waveform at devices 200, 120, 90, 50, and the control unit 12 when device 1 is transmitting a message to device 200. If the detect threshold is 5 volts, then device 200 will be marginal because the waveform only reaches 5 volts at the peak. Assume that device 200 then detects an error and indicates that error by a transmission on the link 14. All other devices originally received the message without error.

When a communication error is recognized by devices or the control unit, devices that received the data/message without error may transmit the original data/message again to the devices coupled to the medium.

In FIG. 3B, device 90 recognized that an error had occurred in the prior communication. Device 90 received the message without error and therefore retransmitted the original message. Due to device 90's retransmission, the waveform had not deteriorated and would be acceptable at all devices. No further errors have been generated by that repeated message so the communication is complete.

If another error had resulted, then another device could again retransmit and the process would repeat until no further errors were detected. The selection of which devices act as the repeater or the order they assume the repeater role can be predetermined by priority or address or some other means without departing from the spirit and scope of the present invention.

FIG. 3C illustrates an example where all devices are capable of transmitting the data simultaneously. In this case, all devices are functioning simultaneously as repeaters. The retransmitted message signal will have acceptable characteristics to the entire group of devices and no error should result. The communication integrity is very high because the signal strength is high everywhere on the link.

In accordance with the present invention, devices can not only initiate or receive transmissions, they can switch to a repeat mode. The phrase "non-repeating transmission" as used herein refers to a device which is attempting to initiate a transmission to one or more receiving devices. In this mode, the subject device is not repeating a transmission on the medium.

Figure 4:
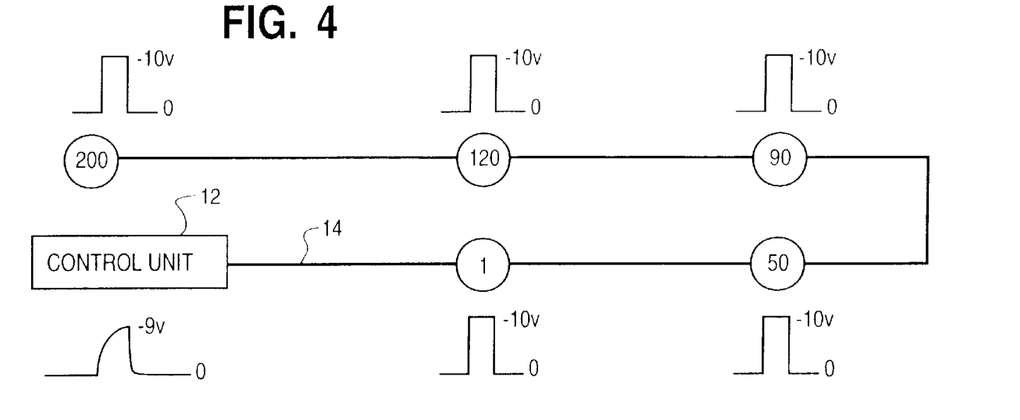
FIG. 4 illustrates an alternate retransmission sequence.

As a normal transmission method if the devices are capable of simultaneously driving data, the devices could all operate as in FIG. 4. Devices could use a contention method to provide priority access of data/messages transmitted on the communication link. If a device drops off the link because it has a lower priority, then those devices could revert to a second mode and become repeaters for the data/message.

Figure 5:
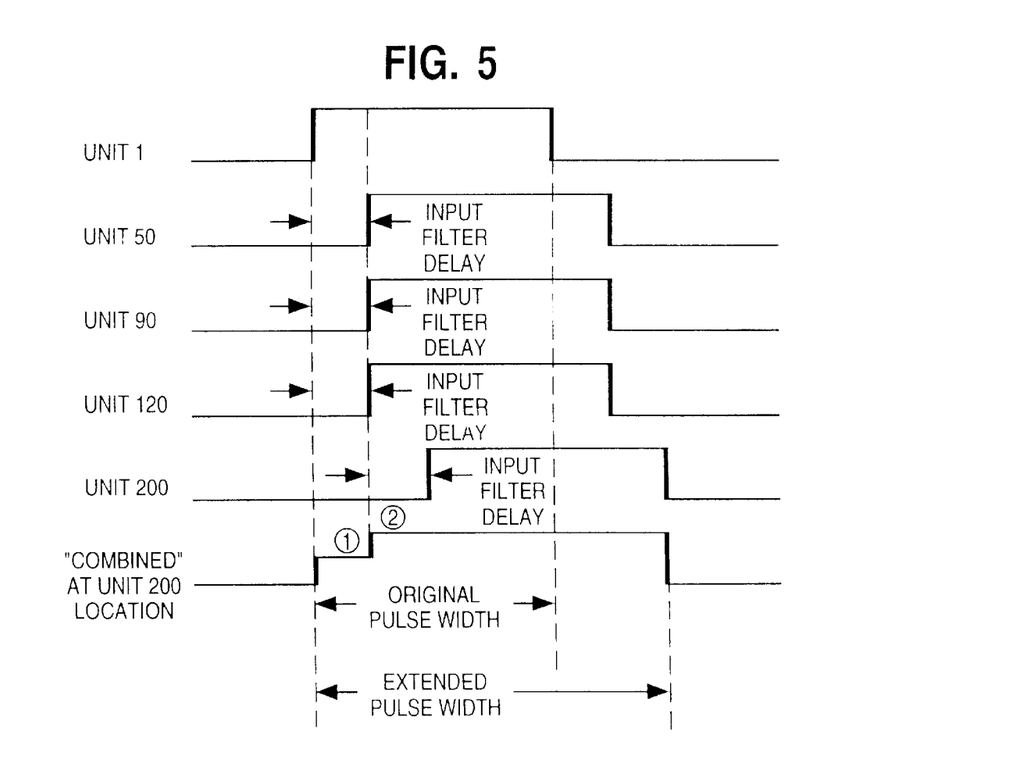
FIG. 5 is a timing diagram for FIG. 4.

In this mode, as soon as a device detects a data value at its input, it would retransmit or drive a data value on the medium 14. The resulting data pulse on the medium or link 14 would be extended in length by any filtering delays associated with device input circuits. This extended time could be acceptable especially if designed into the communication protocol. This would then result in signals with excellent signal strength everywhere on the communication link. FIG. 5 is a timing diagram illustrating how the data waveform would appear on the link 14 with device 1 initially driving the data pulse.

As illustrated in FIG. 5, at point 1, the signal is not sufficient to be received by device 200. But when units 50, 90, and 120 add their data drive to the data drive of unit 1, the signal increases to the level at point 2. Unit 200 now sees a strong signal. The illustrated signal delays ignore wave propagation times that further extend the pulse value, because these times are typically on the order of microseconds. The system is designed to accommodate signals having an extended pulse width.

The communication quality or integrity of the system 10 can be assessed by using system devices, such as the members of the pluralities 18, 20 or 22 to monitor all communications associated with their respective communications media. The members of the pluralities 18, 20, 22 can include instructions for verifying the integrity of received messages irrespective of whether the respective received message is intended for the receiving device. For example, the devices prestored instructions can determine if messages have been received with appropriate check sums or other integrity indicating parameters without limitation.

Each of the respective devices can generate and store, for example in memories 30a or 30b, indicators indicative of the number of received errors. The stored error indicators are indicative of the quality of communications being received by the respective device.

The stored indicators can be accessed by other members of the pluralities 18, 20, 22 or common control element 12 for purposes of assessing over-all system functioning. If a particular device has recorded reception errors which exceed a predetermined criterion, the control element 12 can ascertain that transmission quality in the vicinity of the respective device, or devices, is not adequate. Remedial action or maintenance activities can be undertaken.

System 10 will accumulate error indicators at each of the respective devices without incurring additional overhead relative to transmissions on the medium. The error indicators can be transmitted separately or in combination with other parameters being sent by the respective device to a requesting device or to the control element. Transmissions of the communications integrity indicators can be carried out at low traffic time periods.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A multi-processor communications system wherein the processors can communicate via a medium, the system comprising:

at least one programmed processor wherein the processor includes interface circuitry for transmitting information to the medium to communicate with another processor and for detecting information received from the medium which may be directed to the another processor and wherein the at least one processor includes a plurality of preprogrammed instructions for verifying the integrity of information received from a transmitting unit and wherein the at least one programmed processor rebroadcasts, at least in part, that received information in response to an error indicator being broadcast onto the medium by an intended receiving processor.

2. A system as in claim 1 which includes at least two processors wherein the at least two processors rebroadcast information received with the predetermined degree of integrity in response to an error indicator being broadcast onto the medium by an intended receiving processor.

3. A system as in claim 1 wherein at least one ambient condition sensor is coupled to the processor and wherein the processor includes instructions for receiving information pertaining to the respective ambient condition from the respective sensor.

4. A system as in claim 3 wherein at least some of the sensors are responsive to ambient smoke.

5. A system as in claim 3 wherein at least some of the sensors are responsive to one of position, movement, incident light, gas and fire.

6. A system as in claim 1 wherein the processor includes interface circuitry and instructions for carrying out a respective predetermined output function.

7. A system as in claim 2 which includes a control element, coupled to the medium for communicating with each of the processors and for, at least intermittently, receiving information from at least some of the processors.

8. A system as in claim 2 wherein the processors rebroadcast the information non-simultaneously whereby the rebroadcast information is present on the medium at least twice.

9. A system as in claim 1 which includes a plurality of programmed processors wherein each processor includes instructions enabling the respective processor to receive and transmit information using the medium wherein received information can be retransmitted, substantially automatically, in response to receiving the error indicator, via the medium, from a different processor which was the intended recipient of the received information.

10. A monitoring system comprising:
a plurality of communications units, wherein each of the units communicates with others of the units, wherein each of the units includes detection circuitry for receipt of messages transmitted by others of the units and transmission circuitry for broadcasting messages to at least one other unit, wherein the detection circuitry and the transmission circuitry are coupled to control circuitry wherein the control circuitry includes analysis circuitry for determining if a message, not intended for that unit, has been properly received thereby from another transmitting unit and repeat circuitry for retransmitting at least a part of that message in response to a received message deficiency indicator.

11. A system as in claim 10 wherein the units communicate via one of RF, electrical, optical and ultrasonic transmission.

12. A system as in claim 10 wherein the control circuitry includes, in at least some of the units, a programmed processor.

13. A system as in claim 10 wherein members of a second plurality of the units include ambient condition sensors.

14. A system as in claim 13 wherein members of a third plurality of the units include output circuitry.

15. A system as in claim 10 which includes a common supervisory control element in bidirectional communication with the units.

16. A system as in claim 10 wherein some of the units each include circuitry for initiation of a function and others of the units include instructions for completion of an initiated function.

17. A system as in claim 16 wherein at least some of the sets of instructions for initiation each respond to an external physical event.

18. A system as in claim 17 wherein at least some of the sets of instructions for completion each respond to a received indicator that a selected function has been initiated so as to cause a selected output to occur.

19. A system as in claim 18 wherein some of the units include ambient condition sensors.

20. A communications method comprising:
transmitting a message, directed to at least one electrical unit, to a plurality of units;
receiving the message at the at least one electrical unit and at one other unit;
analyzing the integrity of the message at the at least one electrical unit, and, in response to a lack of integrity transmitting from the at least one electrical unit a defect indicating message; and
analyzing the integrity of the message at the other unit wherein in the event that the other unit determines that the message has been received with a requisite level of integrity, retransmitting at least a part of the received message in response to receipt of the defect indicating message.

21. A method as in claim 20 wherein the message is received at a second other unit and wherein the one other unit and the second other unit both retransmit at least a part of the received message in response to receipt of the defect indicating message.

22. A method as in claim 21 which includes sensing at respective of the units, an ambient condition.

23. A method as in claim 22 which includes, in response to receiving a message with the requisite degree of integrity, at the unit to which the message is directed, carrying out a predetermined function selected from a class which includes generating an audible, speech based, output message, generating an audible alarm indicating output which has a non-speech component, generating a visible output, and, activating a function implementing solenoid.

24. A method as in claim 21 wherein the retransmissions are not simultaneous.

25. A method as in claim 21 which includes initiating predetermined functions at least some of the units and transmitting commands to respective of others of the units to complete the initiated functions.

26. In a communications system having at least three devices in bidirectional communication, a process comprising:
transmitting a message from a first device to an intended second device;
receiving the transmission at a third device; and
retransmitting at least a part of the message from the third device in the event that an error has occurred in the transmitting step.

27. A process as in claim 26 which includes retransmitting the message from the first device.

28. A process as in claim 26 wherein the third device retransmits the entire message.

29. A process as in claim 26 wherein the retransmitting is initiated in response to receiving an error indicating message from the second device.

30. A multi-processor communications system comprising:
a communications link;
a plurality of programmed processors coupled to the link wherein the processors each include interface circuitry for writing information to the link to communicate with another processor and for detecting information on the link which may be directed to the reading processor or another processor and wherein each of the processors includes a plurality of preprogrammed commands for verifying the integrity of information received and circuitry for rebroadcasting information received at the respective processor with a predetermined degree of integrity in response to an error indicator being written onto the link by an intended receiving processor.

31. A system as in claim 30 wherein at least two processors rebroadcast information received with the predetermined degree of integrity in response to an error indicator being written onto the link by an intended receiving processor.

32. A system as in claim 30 wherein at least one ambient condition sensor is coupled to at least each member of a second plurality of the processors and wherein each of those processors includes instructions for receiving information pertaining to the respective ambient condition from the respective sensor.

33. A system as in claim 32 wherein at least some of the sensors are responsive to ambient smoke.

34. A system as in claim 32 wherein at least some of the sensors are responsive to one of position, movement, gas and fire.

35. A system as in claim 32 wherein each member of another plurality of processors includes respective interface circuitry and instructions for carrying out a respective predetermined output function.

36. A system as in claim 35 which includes a common control element, coupled to the link for communicating with each of the processors and for, at least intermittently, receiving information from at least some of the processors.

37. A system as in claim 31 wherein the processors rebroadcast the information non-simultaneously whereby the rebroadcast information is present on the link at least twice.

38. A communications method wherein each member of a plurality of communication units is in bidirectional communication with others of the units and wherein the units include detection circuitry for receipt of messages transmitted by others of the units and transmission circuitry for broadcasting of messages to at least one other unit, wherein the detection circuitry and the transmission circuitry are coupled to the control circuitry, the processing comprising:

sending a first message from a first transmitting unit to a second unit wherein the second unit sends an acknowledgment message in response to receiving the message without error and not otherwise;

receiving the first message and storing it at least at a third unit;

in response to not receiving the acknowledgment message, retransmitting the first message to the second unit from at least the third unit.

39. A method as in claim 38 wherein, if devices are operating as repeaters to retransmit messages, the last unit that sent the message that was not received error free by the next unit is considered the first unit sending the first message and that next unit is considered the second unit.

40. A method as in claim 39 which includes sensing at least one ambient condition at a selected unit.

41. A method as in claim 40 which includes sensing local ambient conditions at a plurality of spaced apart units.

42. A system comprising:

a plurality of communication units, wherein each of the units is in bidirectional communication with others of the units, wherein each of the units includes detection circuitry for receipt of messages transmitted by at least one other unit and transmission circuitry for broadcasting of messages to at least one other unit, wherein the detection circuitry and the transmission circuitry are coupled to the control circuitry;

circuitry at some of the units to identify that a first transmitted message by a first unit was not received without error by a second unit, and;

wherein a third unit will repeat the first transmitted message when it has identified that the second unit did not receive the message without error.

43. A system as in claim 42 wherein, if devices are operating as repeaters to retransmit messages, the last unit that sent the message that was not received error free by the next unit is considered the first unit sending the first message and that next unit is considered the second unit.

44. A multi-processor communications system wherein the processors can communicate via a medium, the system comprising:

at least a first programmed processor wherein the processor includes interface circuitry for transmitting first information to the medium to communicate with another, second, processor and for detecting first information received from the medium which may be directed to the receiving processor or another processor and wherein the system contains programmed instructions to identify that an error has occurred in the first information, and;

a third processor which transmits a second information which contains at least part of the first information onto the medium when an error has occurred in a prior transmission of the first information.

45. A system as in claim 44 where the programmed instructions identify that an error has occurred in the first information by a lack of an acknowledgment message from the second processor after the first processor transmitted the first message.

46. A system as in claim 44 wherein, if processors are operating as repeaters to pass messages between devices, the last processor that send the message that was not received error free by the next processor is considered the first processor sending the first message and the next processor is considered the second processor.

47. A multi-device communication method comprising:

providing at least three devices for transmitting and receiving information;

transmitting information from a first device intended to be received at a second device;

receiving that information, at least in part, at the intended second device and at a third device;

retransmitting from the third device, at least in part, the received information intended for the second device where the second device did not receive the information in an error free state but the third device did.

48. A method as in claim 47 which includes, transmitting an error indicating signal from the second device prior to retransmitting from the third device.

49. A method as in claim 47 which includes detecting at the third device a failure of the second device to transmit a signal indicative of successfully receiving the information prior to retransmitting from the third device.

50. A method as in claim 47 including detecting the presence of an ambient condition in the vicinity of at least one of the devices.

51. A method as in claim 47 which includes, prior to the transmitting step, providing a wired transmission medium and then transmitting to the devices via that medium.

52. A method as in claim 47 which includes, prior to the transmitting step, providing a wireless transmission medium and then transmitting to the devices via that medium.

53. A method as in claim 47 which includes providing a fourth device wherein the fourth device, in addition to the third device, receives that information intended for the second device and wherein the fourth device, in addition to the third device, retransmits, at least in part, received information intended for the second device where the second device did not receive the information in an error free state but the fourth device did.

54. A process for detecting transmission errors in a multiple device transmission system comprising:

providing a common communications medium;

monitoring, at a plurality of devices, communications, via the medium, between devices;

determining the integrity of the monitored messages received at each member of the plurality and generating, at each receiving member, a respective indicator thereof.

55. A process as in claim 54 including using the indicators to determine error prone locations in the system.

56. A multiple device communications system which comprises:
at least one electrical device which includes circuitry for monitoring system communications wherein the device includes a preprogrammed processor and executable instructions for evaluating the integrity of received communications and maintaining an indicator thereof and which includes a common control element in communication with the devices via a common communications medium wherein the element includes instructions for retrieving respective message integrity indicators from the devices.

57. A system as in claim 56 which includes a plurality of electrical devices, substantially identical to the at least one device, for monitoring the integrity of received messages and maintaining respective indicators thereof.

58. A system as in claim 57 wherein the at least one device includes an ambient condition sensor.

59. A system as in claim 56 wherein the medium includes, at least in part, a wired communication link.

60. A multi-processor communication system comprising:
A plurality of processors wherein each of the processors includes circuitry for receiving and transmitting signals via a communications medium and wherein each of the processors includes circuitry for immediately retransmitting received signals whereby a signal strength indicating parameter of a respective signal present in the medium is enhanced, and wherein each of the members of the plurality includes circuitry for initiating a non-repeating transmission via the medium to another processor, wherein retransmitting takes place irrespective of the absence of error in a received signal and which includes a transmission initiating device, and an intended receiving device coupled to the medium wherein the members of the plurality of processors retransmit messages from the initiating device so as to increase the signal strength of messages received at the receiving device.

61. A system as in claim 60 wherein the medium comprises, at least in part, a cable selected from a class which includes an optical cable and an electrical cable.

62. A system as in claim 60 wherein the members of the plurality of processors include executable instructions for initiating a non-repeating transmission to the receiving device and instructions for switching from a transmission initiating mode to a repeating mode.

63. A system as in claim 62 wherein the members of the plurality each include circuitry for determining if a respective processor is entitled to initiate a transmission, and instructions for initiating a non-repeating transmission whereupon other members of the plurality will repeat that transmission.

64. A system as in claim 63 wherein at least some of the members of the plurality include an ambient condition sensor.

65. A system as in claim 64 wherein the processors comprise programmable processors.

66. In a communication system having at least three devices in bi-directional communication, a process comprising:
transmitting a message from a first device to an intended second device;
if the first device determines that an error has occurred in the transmitting of the message to the second device, the first device retransmits the message to a third device, designated as a repeater device; and
the third device retransmits at least a part of the first device's message to the second device.

67. A process as in claim 66 wherein an error occurs when the third device retransmits at least a part of the first device's message to the second device;
the third device retransmits at least a part of the first device's message to a fourth device, designated as a repeater device; and
the fourth device retransmits at least a part of the first device's message to the second device.

68. A process as in claim 66 wherein the third device was previously designated as a repeater device in the event that a message transmission between the first device and the second device contains an error.

69. A process as in claim 66 that includes input or ambient condition sensor devices, such as a gas sensor, fire sensor, smoke sensor, heat sensor, motion sensor, or the like.

70. A process as in claim 66 that includes output or control devices.

71. A process as in claim 66 wherein a central control unit is the designated repeater device.

72. A process as in claim 66 wherein at least part of the system is a fire alarm system.

73. A process as in claim 66 wherein at least part of the system is a control system.

74. A process as in claim 69 or claim 70 wherein the communication linked is by RF or other non-wired media.

75. A multi-processor communications system wherein the processors can communicate via a common medium, the system comprising:
at least one programmed processor wherein the processor includes interface circuitry for transmitting information to the medium to communicate with another processor and for detecting information received from the medium which may be directed to the another processor and wherein the at least one processor includes a plurality of preprogrammed instructions for verifying the integrity of information received from a transmitting unit and wherein the at least one programmed processor rebroadcasts, at least in part, that received information on the medium in response to an error indicator being broadcast on the medium by an intended receiving processor.

76. A system as in claim 75 which includes at least two processors wherein the at least two processors rebroadcast information received with the predetermined degree of integrity on the medium in response to an error indicator being broadcast on the medium by an intended receiving processor.

77. A system as in claim 75 wherein at least one ambient condition sensor is coupled to the processor and wherein the processor includes instructions for receiving information pertaining to the respective ambient condition from the respective sensor.

78. A system as in claim 77 wherein at least some of the sensors are responsive to ambient smoke.

79. A system as in claim 77 wherein at least some of the sensors are responsive to one of position, movement, incident light, gas and fire.

80. A monitoring system comprising:
a plurality of communications units, wherein each of the units communicates with others of the units via a common medium, wherein each of the units includes detection circuitry for receipt of messages transmitted by others of the units via the medium and transmission circuitry for broadcasting messages to at least one other unit via the medium, wherein the detection circuitry and the transmission circuitry are coupled to control circuitry wherein the control circuitry includes analysis circuitry for determining if a message, not intended for that unit, has been properly received thereby from another transmitting unit and repeat circuitry for retransmitting at least a part of that message via the medium in response to a received message deficiency indicator.

81. A system as in claim 80 wherein the units communicate via one of RF, electrical, optical and ultrasonic transmission.

82. A system as in claim 80 wherein members of a second plurality of the units include ambient condition sensors.

83. A system as in claim 80 wherein some of the units each include circuitry for initiation of a function and others of the units include instructions for completion of an initiated function.

84. A system as in claim 83 wherein at least some of the sets of instructions for initiation each respond to an external physical event.

85. A system as in claim 84 wherein at least some of the sets of instructions for completion each respond to a received indicator that a selected function has been initiated so as to cause a selected output to occur.

86. A system as in claim 85 wherein some of the units include ambient condition sensors.

87. A multi-processor communication system comprising:

a common communications medium;

a plurality of processors coupled to the medium wherein each of the processors includes circuitry for receiving and transmitting signals via the medium and wherein each of the processors includes circuitry for immediately retransmitting received signals whereby a signal strength indicating parameter of a respective signal present in the medium is enhanced, and wherein each of the members of the plurality includes circuitry for initiating a non-repeating transmission via the medium to another processor.

88. A system as in claim 87 wherein retransmitting takes place irrespective of the absence of error in a received signal.

89. A system as in claim 88 which includes a transmission initiating device, and an intended receiving device coupled to the medium wherein the members of the plurality of processors retransmit messages from the initiating device so as to increase the signal strength of messages received at the receiving device.

90. A system as in claim 87 wherein the members of the plurality of processors include executable instructions for initiating a non-repeating transmission to the receiving device and instructions for switching from a transmission initiating mode to a repeating mode.

* * * * *